United States Patent Office 3,134,997
Patented June 2, 1964

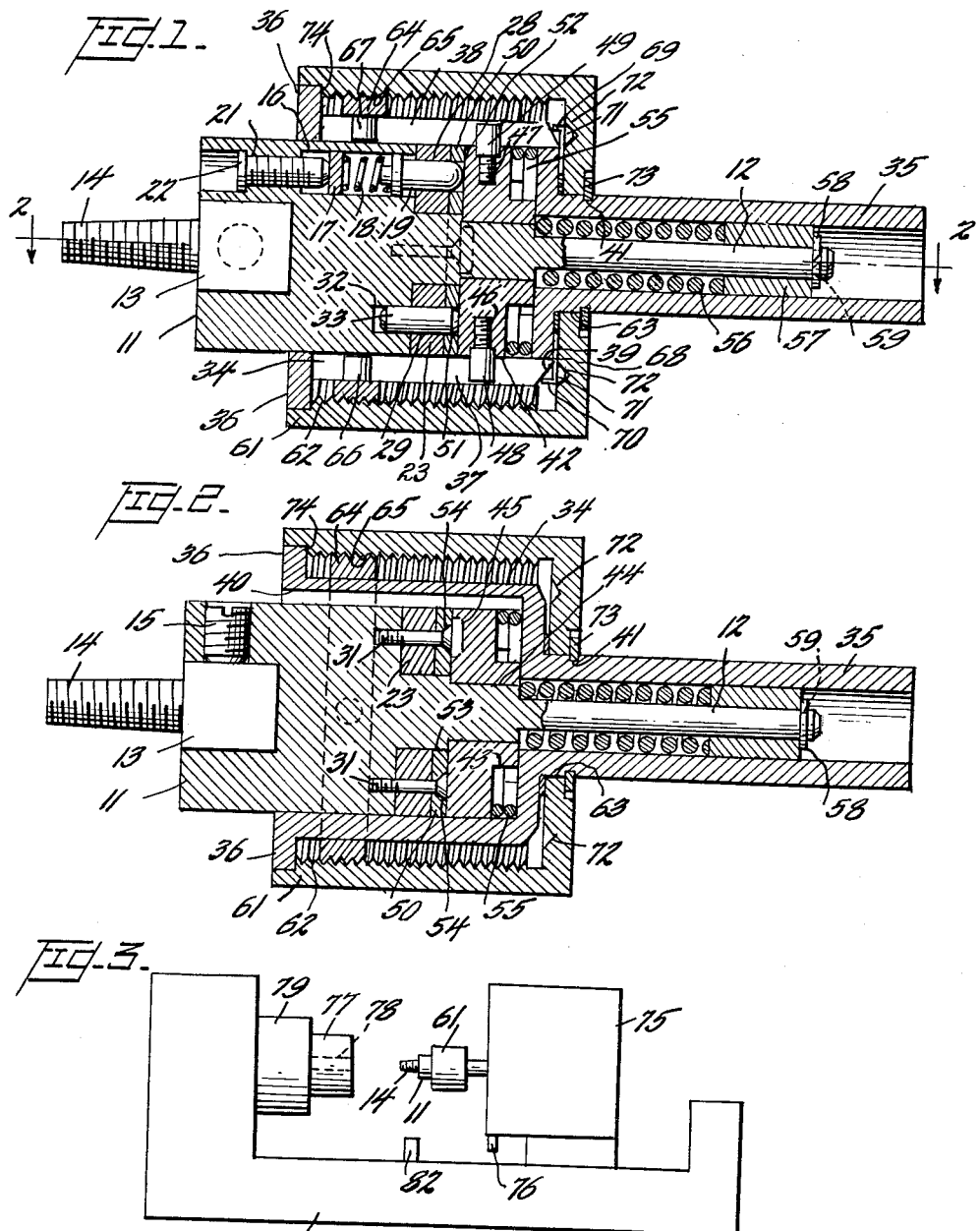

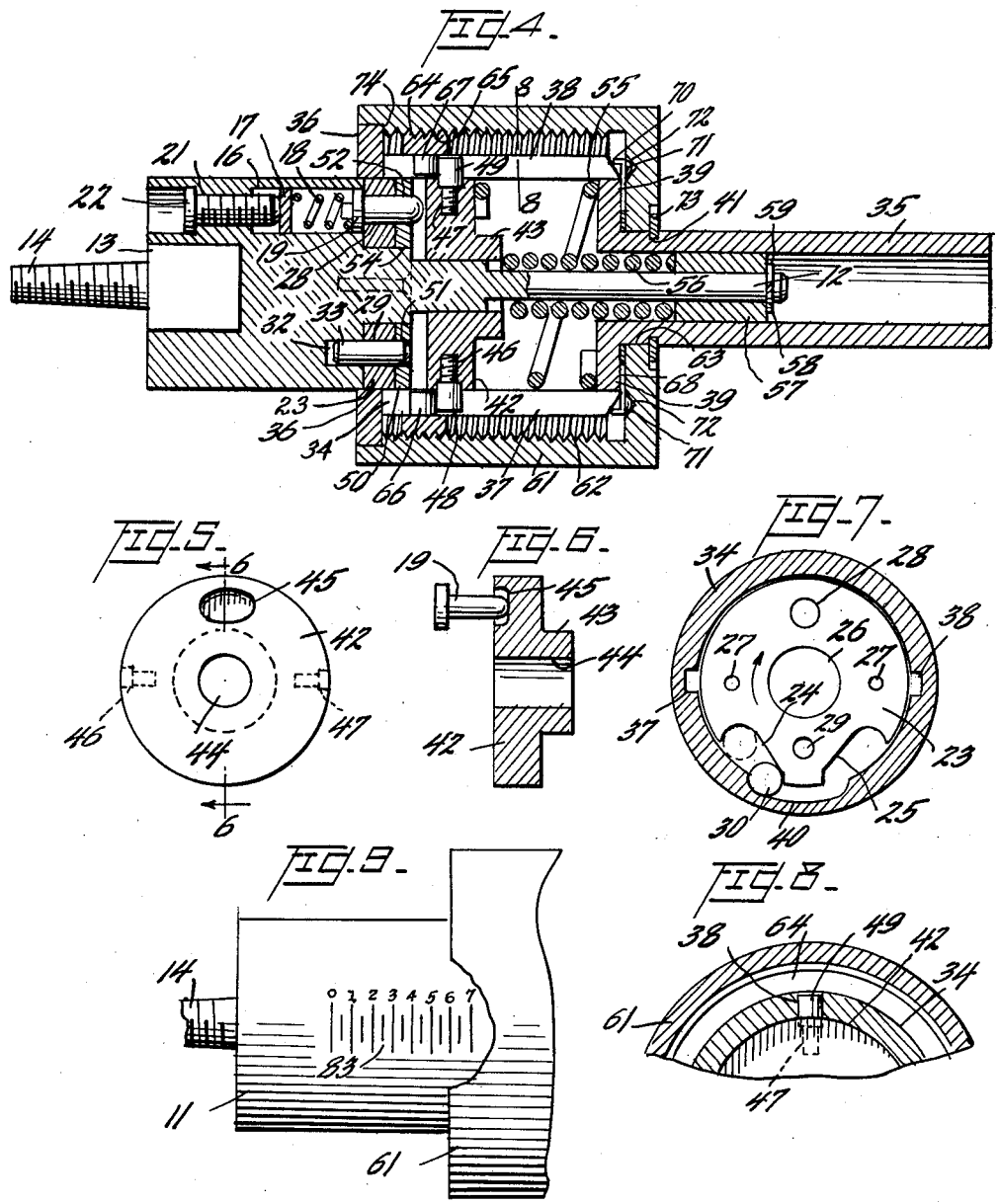

3,134,997
OVERLOAD RELEASE TAP HOLDER
Henry C. Walker, Hillsboro, N.C., assignor to Western Electric Company, Incorporated, a corporation of New York
Filed Aug. 15, 1961, Ser. No. 133,756
2 Claims. (Cl. 10—135)

This invention relates to an overload release tap holder and more particularly to a holder for allowing the release of a tap upon binding.

In the tapping of various types of metals and plastics it is important to prevent a tap from binding within an aperture of a workpiece. Occasionally, particles which have been cut from the aperture by the tap are not removed properly, thereby resulting in the binding of the tap relative to a workpiece. Thus it is easily seen that the tap will be sheared and a portion of the tap will remain within the workpiece. This necessitates the replacing of the tap and the discarding of the workpiece containing a portion of the sheared tap.

One object of this invention is to provide a new and simple overload release tap holder.

An additional object of this invention is the provision of a tap holder for accurately limiting the extent of a tapping operation.

A further object of this invention is the provision of a tap holder adapted to release the tap upon encountering a bind during the tapping operation.

It is another object of the invention to provide a tap holder and work holder that rotate relative to each other wherein the tap holder has an axially slidable clutch that is disengaged upon completion of tapping of the workpiece.

A still further object of this invention is the provision of a non-rotating tap holder which releases the tap chuck upon completion of the tapping operation within a rotating workpiece where, upon reversal of the workpiece rotation, the tap chuck is urged back into the holder.

With these and other objects in mind, the present invention contemplates a tap holder for releasing the tap upon binding and for limiting and retracting the tap upon completion of the tapping operation. A tap-holding chuck is slidably contained within a nonrotating housing for axial movement. The housing is then mounted in a slidable turret and positioned to insert the tap in a rotating workpiece. The tapping operation urges the tap into the workpiece until the slidable turret engages a fixed stop whereupon the chuck slides axially and outwardly from the housing to continue the tapping. Eventually the chuck engages a stop within the housing and the tap is released to rotate with the workpiece. When the workpiece rotation is reversed, the tap is urged outwardly from the workpiece and assumes the original position within the housing. It is to be noted that the tap could rotate while the workpiece remains stationary.

In addition, the invention contemplates a clutch which cooperates with a clutch pin within the chuck to release the tap in the event the tap should attempt to bind within the rotating work, thereby allowing the tap to rotate freely with the work.

Other objects and advantages of the invention will become apparent by reference to the following detailed description and the accompanying drawings illustrating a preferred embodiment thereof, in which:

FIG. 1 is a sectional view of a tap holder, shown in a tapping position, for releasing a tap upon overload embodying the principal features of the present invention;

FIG. 2 is a sectional view of the tap holder taken along line 2—2 of FIG. 1 to show other details of the tap holder during a tapping operation;

FIG. 3 is a view of the tap holder mounted in a slidable turret and opposite a rotating workpiece;

FIG. 4 is a sectional view of the tap holder shown in a floating, non-operating position;

FIG. 5 is a view of a clutch plate having a recess as shown in FIGS. 1 and 2;

FIG. 6 is a detailed view of a driving pin cooperating with the clutch plate as shown in FIGS. 1 and 4;

FIG. 7 is a detailed view of a reverse locking plate with a reverse locking roller cooperating with a recess formed in a housing of the tap holder;

FIG. 8 is a partial sectional view taken along lines 8—8 of FIG. 4 showing a pin mounted in the clutch plate cooperating with a slot formed in the housing; and FIG. 9 is a view of a scale placed on a chuck of the tap holder to cooperate with an adjusting feature to indicate the depth of a tapped aperture.

Referring in detail to the drawings, a chuck 11 is provided with a shaft or shank 12 at one extremity and an opening 13 at the opposite extremity for receiving a tap 14. In addition a set screw 15 is provided for fastening the tap 14 within the opening 13. The chuck 11 also has an aperture 16 formed therein for receiving a pad 17, a spring 18, and a driving pin 19. The aperture 16 is provided with a threaded reduced portion 21 for receiving an adjustment screw 22 which engages the pad 17.

Referring to FIG. 7, a reverse locking plate 23, having cam surfaces 24 and 25, is formed with a central aperture 26. Additionally, a series of apertures 27, 28, and 29 are also formed in the reverse locking plate 23. A roller 30 is inserted into either cam surface 24 or 25.

As shown in FIGS. 1 and 2, the reverse locking plate 23 is positioned about the shaft 12 of the chuck such that the driving pin 19 is positioned within the aperture 28. Further, the locking plate 23 is fastened to the chuck 11 by means of screws 31 placed through apertures 27 of the locking plate and threadedly mounted in the chuck. In addition, aperture 29 of the locking plate 23 is aligned with an opening 32 to receive a dowel pin 33 therein.

A tubular housing 34 is provided with a projecting sleeve 35 at one extremity and a flange 36 at the other extremity. In addition, a pair of opposing slots 37 and 38 extend longitudinally through a portion of the housing 34. Also, the tubular housing 34 is provided with a pair of radially opposed bevelled slots 39 and an annular undercut 41 in the sleeve 35. Additionally, as noted in FIGS. 2 and 7, the housing 34 is formed with a recess 40 extending longitudinally of the housing inner wall for receiving the roller 30.

A top plate 50 having apertures 51 and 52 and a central bore 53, is positioned about the shaft 12 of the chuck 11 such that the dowel pin 33 and the drive pin 19 are received respectively by apertures 51 and 52. In addition, the top plate 50 is provided with a pair of countersunk apertures 54 which are aligned with the apertures 27 of the locking plate 23 to receive the screws 31 thereby fastening the locking plate 23 and the top plate 50 to the chuck 11 as shown in FIG. 2.

As viewed in FIGS. 5 and 6, a clutch plate 42, having a hub 43, is provided with a central bore 44 and a tapered recess 45 on one face thereof. In addition, a pair of diametrically opposed tapped openings 46 and 47 are formed in the periphery of the clutch plate 42 where a pair of threaded pins 48 and 49 are inserted into the openings 46 and 47, respectively. A spring 55 is positioned about the annular shoulder 43 of the clutch plate 42. The clutch plate 42 is coaxially positioned about the shaft 12 of the chuck 11 wherein the drive pin 19 engages the tapered recess 45 and the clutch plate engages the top plate 50, where the particular cooperation between pin 19 and recess 45 is shown in FIG. 6.

The chuck assembly, including the locking plate 23, top plate 50, and the clutch plate 42, is slidably positioned within the tubular housing 34 such that the shaft 12 extends into the sleeve 35 and the pins 48 and 49 slidably engage the slots 37 and 38, respectively, where the particular cooperation between the pins and the slots is shown in FIG. 8.

A compression spring 56 is positioned within the sleeve 35 of the housing 34 and coaxially about the shaft 12 of the chuck 11. A bearing 57 is slidably positioned within the sleeve 35 of the housing 34 and coaxially positioned about the free shaft 12 of the chuck 11 where a retainer ring 58 is positioned within an undercut 59 on the free end of the shaft to retain the spring 56 and the bearing 57 on the shaft 12.

An adjusting collar 61, having an internally threaded wall 62 and a central bore 63, is coaxially positioned about the exterior of the sleeve 35 of the housing 34. A carriage ring 64, having a threaded periphery 65 and a pair of opposing radially inward projections 66 and 67, is threadedly mounted within the adjusting collar 61. It is to be noted that the projections 66 and 67 slidably engage the slots 37 and 38, respectively, of the housing 34. In addition, an annular leaf spring 68, having a pair of opposed arms 69 and 70 extending radially outward from the spring, is provided with a rounded projection 71 on each of the arms. The spring 68 is positioned about the sleeve 35 of the housing 34 such that the arms 69 and 70 coincide with the bevelled slots 39 of the housing. Thus it is easily seen that the projections 71 engage one of a plurality of pairs of recesses 72 radially formed in the inner wall of the adjusting collar 61 as shown in FIGS. 1, 2 and 4. A retaining ring 73 is positioned within the undercut surface 41 of the sleeve 35 to retain the adjusting collar 61 in a longitudinally fixed position. It is to be noted that the flange 36 of the housing 34 abuts a shoulder 74 of the adjusting collar 61, thereby retaining the adjusting collar between the flange 36 and the retaining ring 73.

In an illustrative operation, the chuck 11 assumes a non-operating position, similar to the position shown in FIG. 4 where the biasing of the compression spring 55 provides a floating assembly consisting of the tap 14, the chuck 11, the locking plate 23, and the clutch plate 42. It is to be noted that the drive pin 19 remains in engagement with the recess 45 of the clutch plate 42 when the chuck 11 is in a non-operating position although FIG. 4 does not show this feature. The sleeve 35 of the housing 34 is mounted within a slidable turret 75 having a projection 76, as shown in FIG. 3. A workpiece 77, having a central aperture 78, is positioned in a conventional rotating chuck 79 where the rotating chuck 79 and the slidable turret 75 are commonly mounted on a work table 81. In addition, an adjustable stop 82 is mounted on the work table 81 in the path of the projection 76 of the slidable turret 75. The slidable turret 75, is positioned such that the tap 14 will engage the rotating workpiece 76.

The floating action of the tap 14 and the chuck 11 facilitates self aligning of the tap within the workpiece 77 thereby maintaining a common centerline during the tapping operation. Due to the relative rotation between the workpiece 77 and the tap 14, a tapping operation results as the slidable turret 75 is urged towards the workpiece 77. However, the operational speed of the turret 75 is at a faster rate than the rate of the tapping operation. Hence, the chuck 11 will assume a position similar to that shown in FIGS. 1 and 2. As the projection 76 engages the fixed stop 82, the tap 14, the chuck 11, locking plate 23, and clutch plate 42, will continue to be drawn into the workpiece. It is to be noted that as the chuck assembly is drawn towards the workpiece 77, the pins 48 and 49 will slide within the slots 37 and 38, respectively, of the housing 34. As viewed in FIG. 4, this operation will continue until the pins 48 and 49 engage projections 66 and 67, respectively, of the carriage ring 64. Continued rotation of the workpiece 77 draws the tap 14 still further into the aperture 78 of the workpiece; thus, the chuck 11 is further withdrawn and the pin 19 moves from within the tapered recess 45 of the clutch plate 42 whereupon the tap, and hence the chuck 11, will rotate freely with the workpiece 77.

Upon reversal of the rotation of the workpiece 77, tap 14, and hence the chuck 11, will rotate with the workpiece. Since the reverse locking plate 23 is fastened to the chuck 11, the plate will also rotate, thereby forcing roller 30 outwardly along the cam surface 24 to frictionally engage the inner wall, and hence the longitudinal recess 40, of the housing 34 as shown in FIG. 7. Thus it is easily seen that the chuck 11, and hence the tap 14, will cease to rotate due to the frictional engagement of the roller 30 with the recess 40 of the housing 34. As the workpiece 63 continues to rotate in the reverse direction, the non-rotating tap 14 will be threadedly urged outward from the workpiece 77 and against the biasing of spring 55 to assume the normal position wherein the drive pin 19 once again engages the tapered recess 45 of the clutch plate 42.

If during the tapping operation the tap 14 should bind within the aperture 78 due to the lack of proper removal of bits of material, a torque will be exerted upon the tap 14 and hence upon the chuck 11. The torque tends to rotate the chuck 11 in the same direction of rotation as the workpiece 77. This reaction urges the drive pin 19, against the action of spring 18, out of engagement with the tapered recess 45 of the clutch plate 42, in a manner similar to that shown in FIG. 4, thereby allowing the chuck 11 and the tap 14 to rotate freely with the workpiece 77. Repetitive action of this type serves to jog the bits of material from within the aperture 78, thereby permitting the tapping operation to continue when the drive pin 19 again engages tapered recess 45 of the clutch plate 42. Thus it is easily seen that damage to the tap 14 as well as to the workpiece 77 is prevented in this manner.

As shown in FIGS. 5 and 6, the clutch plate 42 is provided with the tapered recess 45. In addition, the drive pin 19 is provided with a tapered or rounded end which engages the tapered recess 45 to provide a smooth disengagement between the pin 19 and the recess 45, as previously described.

As viewed in FIG. 7, the pair of cam surfaces 24 and 25 are formed in the periphery of the reverse locking plate 23. The roller 30 is positioned at the lower end of one of the cam surfaces, for example cam surface 24. Since the plate 23 is fastened to the chuck 11, the plate will rotate with the chuck 11. During a tapping operation for providing right-hand threads within the aperture 78 of the workpiece 77, the locking plate 23 is rotated in a counterclockwise direction. Thus the roller 30 is urged inwardly along the cam surface 24 against the rotational movement and hence will not engage the inner wall nor the recess 40 of the housing 34. Upon completion of the tapping operation, the rotation of the workpiece 77, and hence the chuck 11 and locking plate 23, are reversed as previously described, thereby driving the assembly in a clockwise direction. This rotational movement urges the roller 30 from a non-engaging position within the cam surface 24 to a position where the roller is frictionally urged between cam surface 24 and the longitudinal recess 40 of the housing 34 as shown in FIG. 7. Thus it is easily seen that a gripping action will prevent further rotation of the chuck 11 and the tap 14. A tap withdrawal process then occurs as previously described.

In the event it is desired to provide left-hand threads for the aperture 78 of workpiece 77, a reversal of the rotational sequence is necessitated. To accommodate the reversed rotational sequence, the second cam surface 25 is provided in the reverse locking plate 23 whereupon the roller 30 is removed from the cam surface 24 and inserted into the cam surface 25. Thus it is easily seen that a similar type operation occurs in the same manner as previously described.

As previously stated, the projections 71 of the annular leaf spring 68 engage one of a plurality of pairs of recesses 72 formed in the inner wall of the adjusting collar 61. Thus it is easily seen that as the adjusting collar 61 is rotated, a snap action or indexing is provided in a manner similar to that of the well-known ball and check operation. It is to be noted that the bevelled slots 39 of the housing 34 provides a clearance for the arms 69 and 70 of the leaf spring 68 during the indexing operation. Further, as the adjusting collar 61 is rotated, the carriage ring 64 is axially positioned within the adjusting collar due to the threaded relation between the ring and the collar. It is to be noted that the projections 66 and 67 of the ring 64 slide within the slots 37 and 38, respectively, of the housing 34 when the adjusting collar 61 is rotated. In this manner the travel of pins 48 and 49 and hence the clutch plate 42 is limited and adjustable by the positioning of the projections 66 and 67 within the slots 37 and 38 of the housing 34.

As previously noted, adjustment screw 22 is positioned within the reduced portion 21 of chuck aperture 16 and abuts pad 17 to provide an external means for adjusting the tension of spring 18 upon drive pin 19. In this manner the position at which the chuck 11 will be released from the clutch plate 42 can be varied to facilitate various types of tapping operations.

A scale 83 is provided on the peripheral surface of the chuck 11, as shown in FIG. 9. When the tap is in a non-operating or floating position (FIG. 4), rotation of the adjusting collar 61 positions the projections 66 and 67 within the slots 37 and 38, of the housing 34. Thus the relative travel of the chuck 11 with respect to the collar 61 is limited and hence the depth of tapping is controlled. By visually noting the position of the scale 83 with respect to the outer surface of the flange 36 of the housing 34, the depth of the tapping operation may be ascertained and set. It is noted that when the chuck 11 is contained within the housing 34 (FIGS. 1 and 2) during the initial and early stages of the tapping operation, the zero marking of scale 83 will coincide with the outer surface of the flange portion 36 of the housing 34.

It is to be understood that the above-described arrangements are simply illustrative of an application of the principles of the application. Numerous other arrangements may be devised by those skilled in the art which will embody the principles of the invention and will fall within the spirit and scope thereof.

What is claimed is:
1. In an overload release tap holder for jogging an obstruction loose from a hole being tapped in a rotating workpiece, a tubular housing having a longitudinal slot, a clutch plate having a tapered recess formed in one face slidably mounted in said housing, a stop pin mounted on said clutch plate and extending into said slot, a chuck slidably and rotatably mounted in said housing for holding a tap, spring means for urging said chuck and clutch together, a tapered clutch pin slidably mounted in said chuck and extending into the recess in said clutch, an externally threaded ring slidably mounted on said housing, a limit pin mounted on said ring and depending into said slot for engaging said stop pin to limit movement of said clutch plate as the chuck advances during tapping to compress said spring means and withdraw the clutch pin from the recess to disengage said chuck from said clutch plate, a threaded collar rotatably mounted about said housing and cooperating with the threaded ring for longitudinally adjusting the limit pin in the longitudinal slot, means for advancing the housing to move the tap into a rotating workpiece, and a spring engaging and urging the clutch pin into the recess with a predetermined force which is overcome by the tap engaging an obstruction for intermittently disengaging and reengaging the clutch pin with the recess until the obstruction is jogged free.

2. In an overload release tap holder for jogging an obstruction loose from a hole being tapped in a rotating workpiece, a tubular housing having a pair of opposed longitudinal slots, a circular clutch plate slidably mounted within said tubular housing, a pair of stop pins mounted on said clutch plate and extending into said longitudinal slots, said clutch plate having a tapered recess formed in the face thereof, a chuck slidably and rotatably mounted within said housing for holding a tap, a tapered clutch pin slidably mounted in said chuck and extending into the recess, resilient means urging together said clutch plate and chuck, a ring having peripheral threads slidably mounted on said housing, a pair of diametrically opposed pins mounted on and projecting inwardly from said ring into said pair of slots for engaging said stop pins to limit movement of said clutch plate while the chuck advances under the control of the tap to compress the resilient means and withdraw the clutch pin from the recess to disengage the chuck from the clutch plate, an internally threaded collar rotatably mounted on the housing cooperating with the threads on the ring for longitudinally adjusting the position of the limit pins in the longitudinal slots, means for advancing the housing to move the tap into a rotating workpiece, and a spring urging the clutch pin into the recess in the clutch plate until an obstruction is encountered by the tap whereupon the tapered surface of the clutch pin reacts against the surface of the recess to depress said spring to free the chuck from the clutch plate and allow said clutch pin to rotate and cyclically reengage the recess to jog said tap until the obstruction is jogged loose.

References Cited in the file of this patent
UNITED STATES PATENTS

| | | |
|---|---|---|
| 2,391,671 | Berg | Dec. 25, 1945 |
| 2,392,809 | Cote | Jan. 15, 1946 |
| 2,723,406 | Angst | Nov. 15, 1962 |